Figure 1:
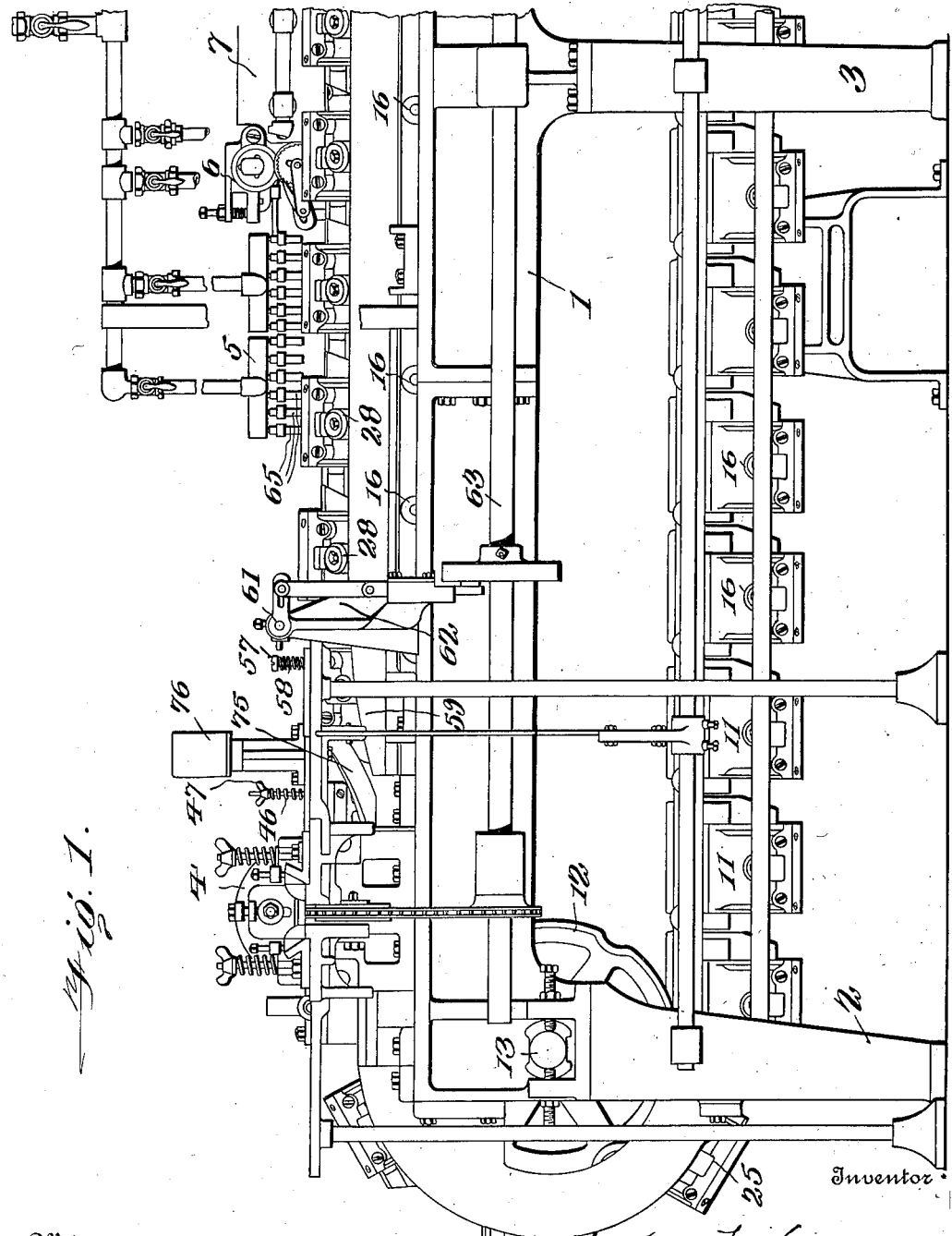

I. F. WARME.
LAP SEAM BODY MAKER.
APPLICATION FILED JULY 17, 1912.

1,094,179.

Patented Apr. 21, 1914.

7 SHEETS—SHEET 1.

Witnesses

Inventor
Ivar F. Warme
By Sturtevant & Mason
Attorneys

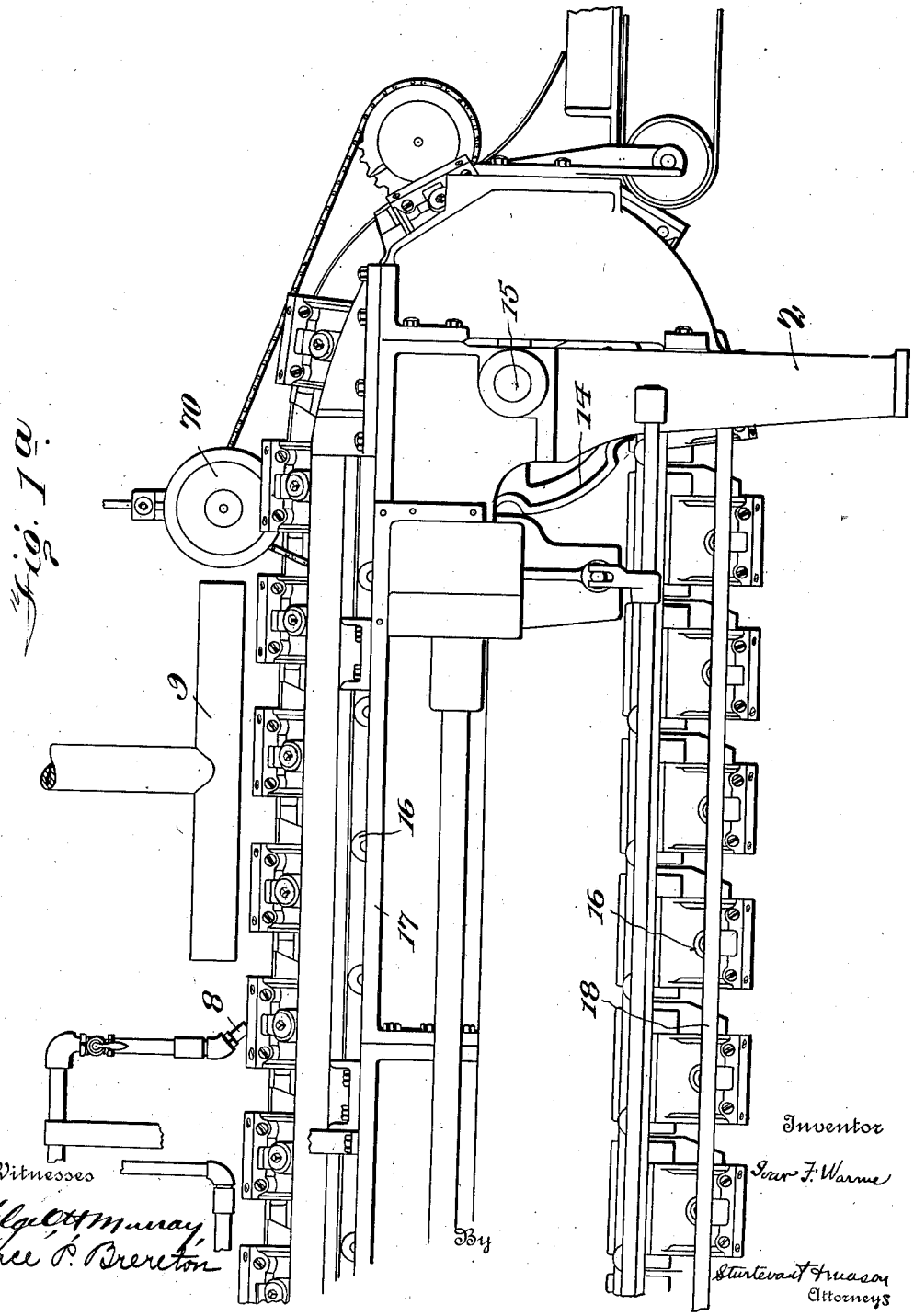

I. F. WARME.
LAP SEAM BODY MAKER.
APPLICATION FILED JULY 17, 1912.
1,094,179.
Patented Apr. 21, 1914.
7 SHEETS—SHEET 3.
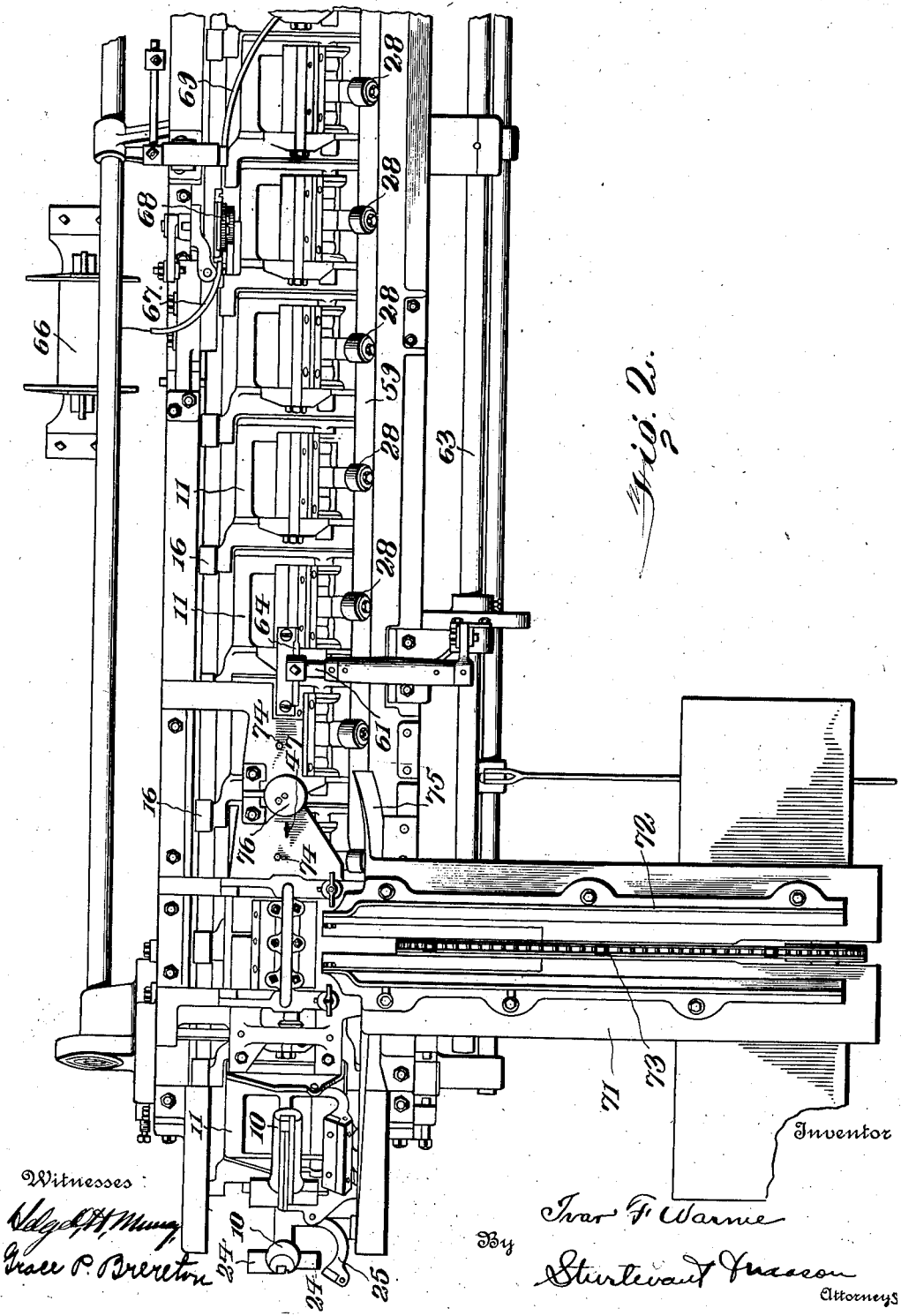
Witnesses
Inventor
Ivar F. Warme
By Sturtevant & Mason
Attorneys

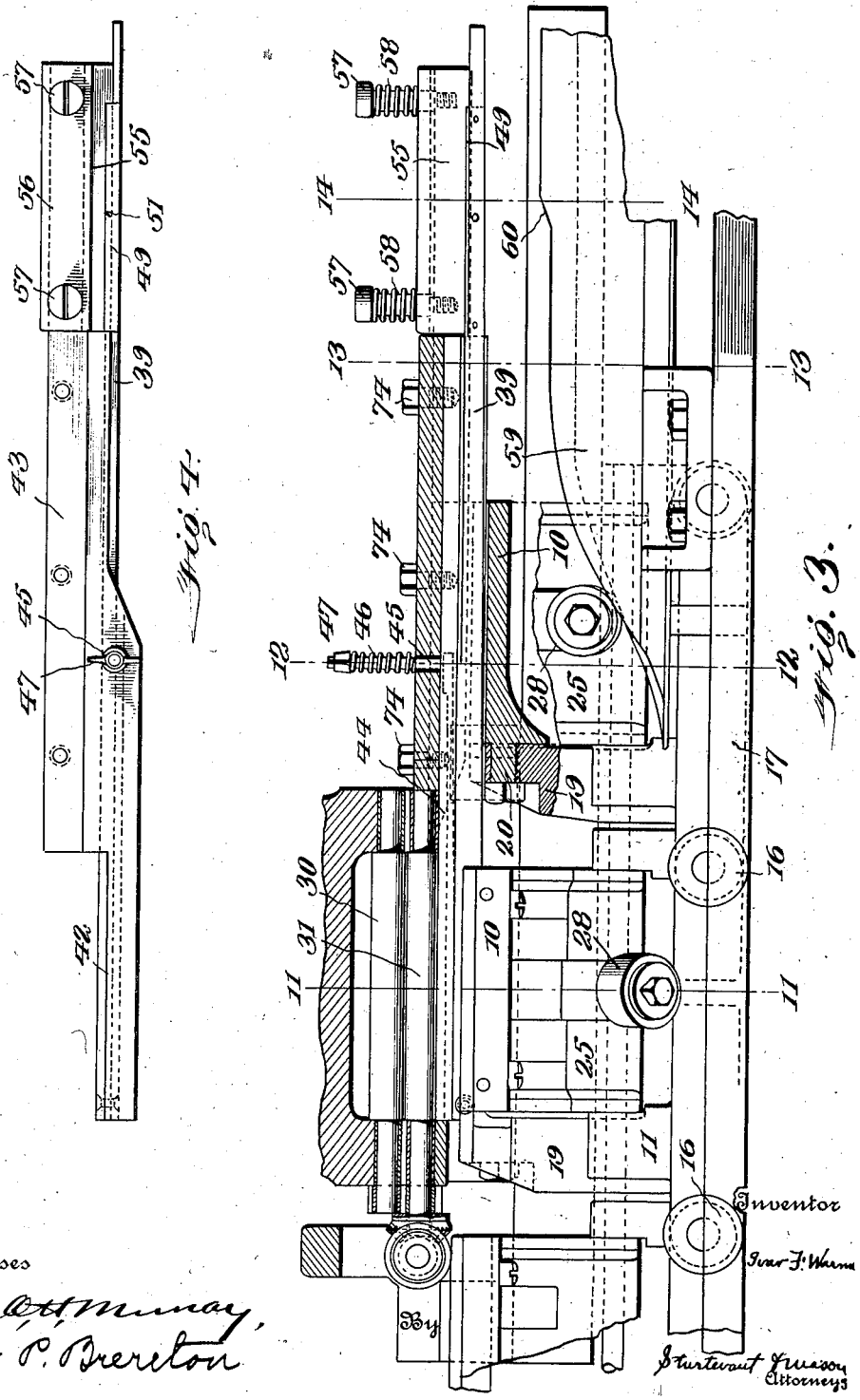

I. F. WARME.
LAP SEAM BODY MAKER.
APPLICATION FILED JULY 17, 1912.
1,094,179.
Patented Apr. 21, 1914.
7 SHEETS—SHEET 5.
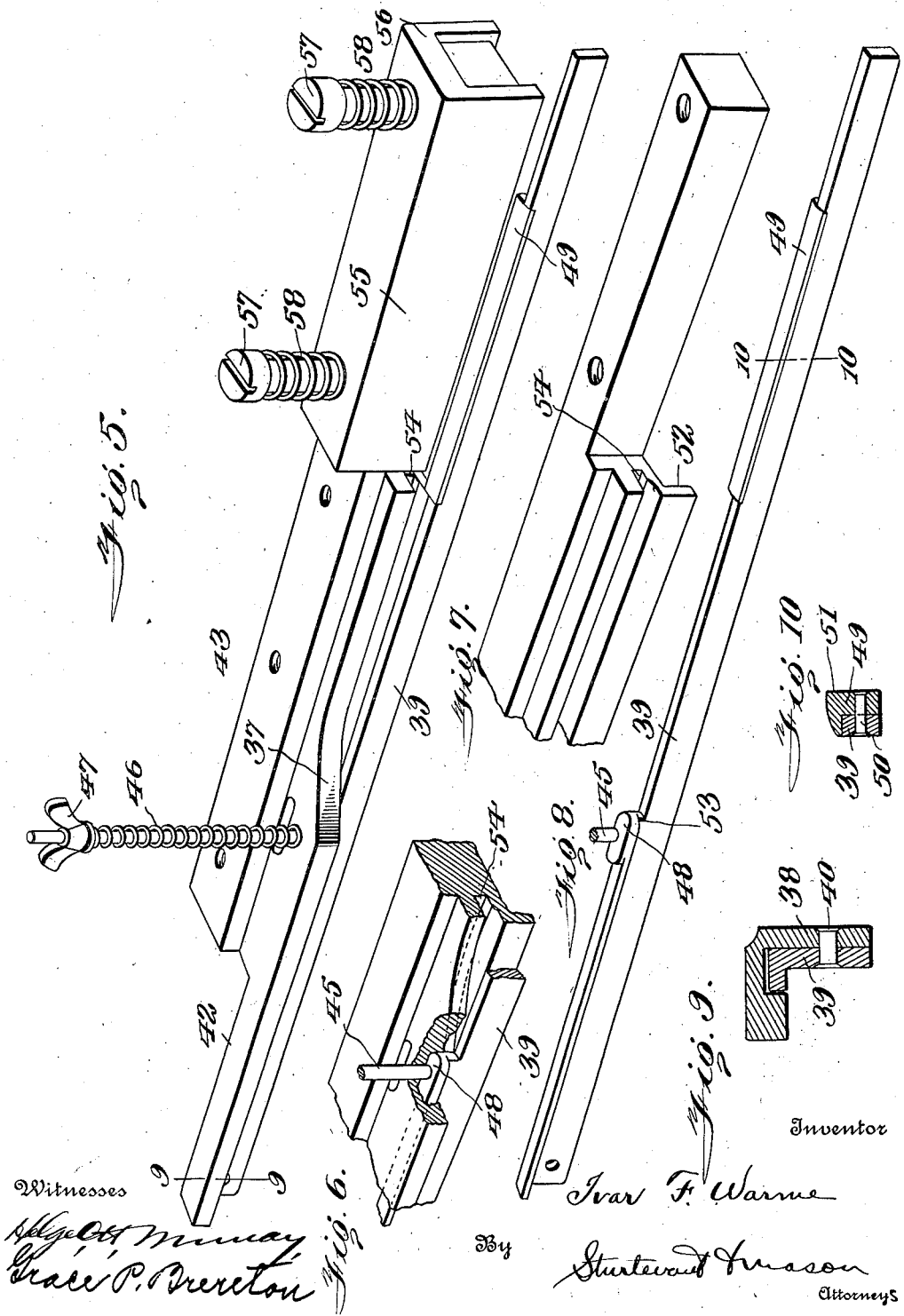

I. F. WARME.
LAP SEAM BODY MAKER.
APPLICATION FILED JULY 17, 1912.
1,094,179.
Patented Apr. 21, 1914.
7 SHEETS—SHEET 6.
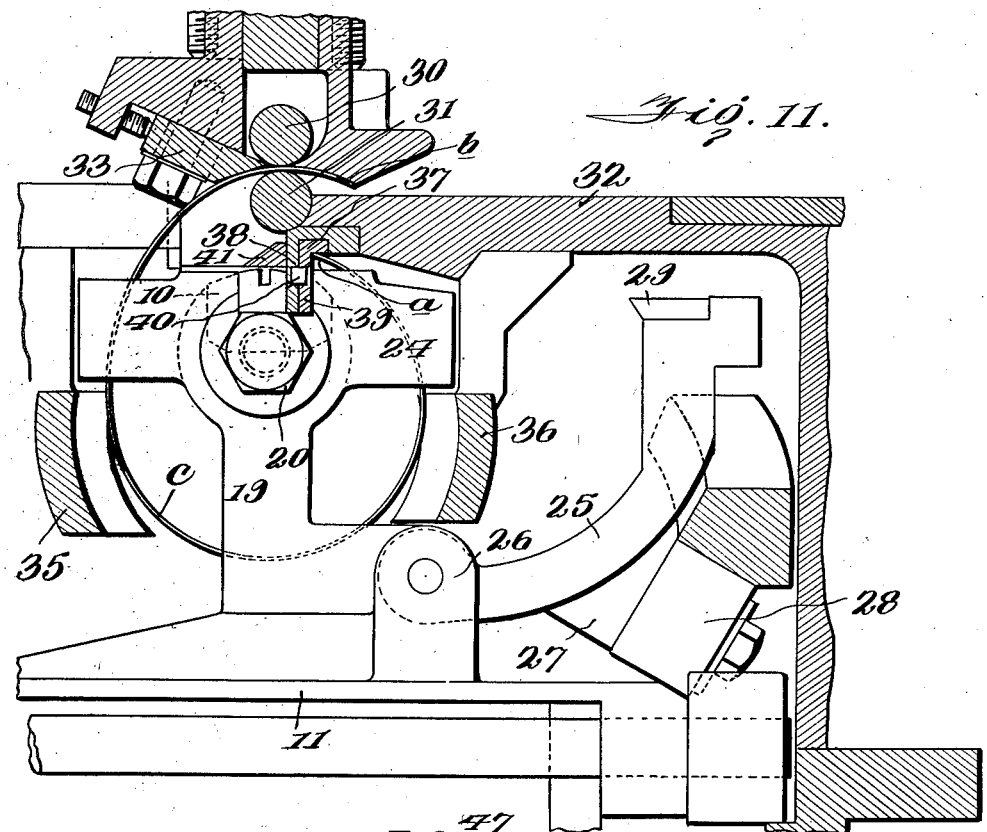
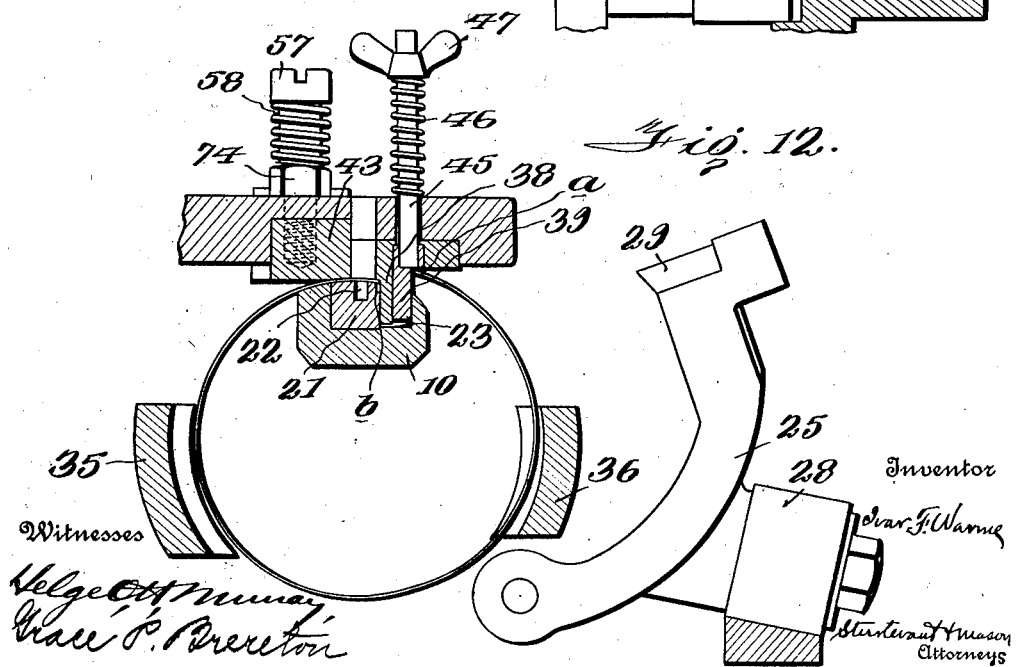
Witnesses
Inventor
Ivar F. Warme
Sturtevant & Mason
Attorneys I. F. WARME.
LAP SEAM BODY MAKER.
APPLICATION FILED JULY 17, 1912.
1,094,179.
Patented Apr. 21, 1914.
7 SHEETS—SHEET 7.
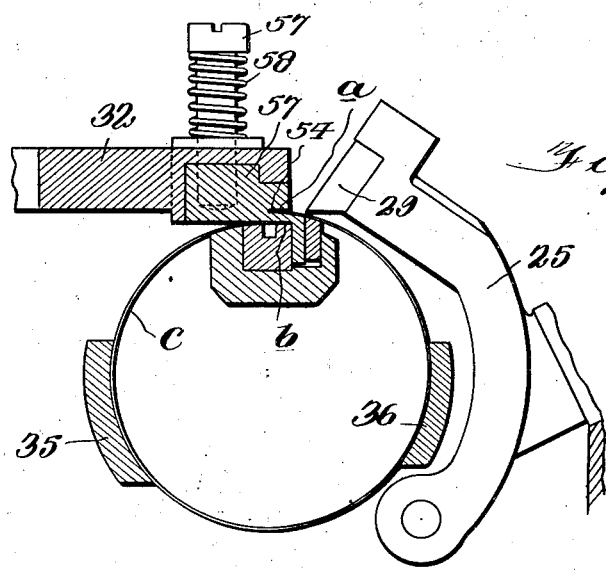
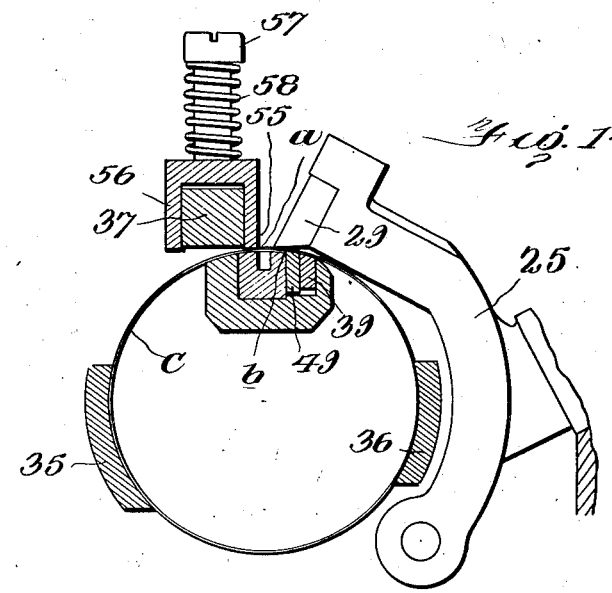

UNITED STATES PATENT OFFICE.

IVAR F. WARME, OF SYRACUSE, NEW YORK, ASSIGNOR, BY MESNE ASSIGNMENTS, TO CONTINENTAL CAN COMPANY, INC., A CORPORATION OF NEW YORK.

LAP-SEAM-BODY MAKER.

1,094,179. Specification of Letters Patent. Patented Apr. 21, 1914.

Application filed July 17, 1912. Serial No. 709,926.

*To all whom it may concern:*

Be it known that I, IVAR F. WARME, a citizen of the United States, residing at Syracuse, in the county of Onondaga, State of New York, have invented certain new and useful Improvements in Lap - Seam - Body Makers, of which the following is a description, reference being had to the accompanying drawing and to the figures of reference marked thereon.

The invention relates to new and useful improvements in can body seaming machines, and more especially to machines of this character for making a lapped side seam.

An object of the invention is to provide devices for gaging the overlapping side edges of a can body, and also devices for clamping the gaged, overlapped edges of each can body, and for holding the same until soldered.

A further object of the invention consists in providing means for gaging the edges of the can body, which gaging means operates upon each can body, whereby said can bodies may be made of more uniform size.

A further object of the invention is to provide a gaging device of the above character, which includes a disappearing gage for the under edge, that is, a gage which moves down into the horn to allow the overlapping edge to be clamped to the horn.

A still further object of the invention is to provide a gage for the edge of the can body, which includes a device for gaging the overlapped edge, which device is yieldingly pressed against the can body, so as to engage with certainty, the edge overlapped, and hold the same firmly until clamped.

These and other objects will in part be obvious, and will in part be hereinafter more fully described.

In the drawings which show by way of illustration one embodiment of the invention; Figure 1 and Fig. 1ª show a side elevation of a complete lapped seam body maker, having my improvements applied thereto; Fig. 2 is a plan view of the feeding-in end of the machine; Fig. 3 is a detail partly in side elevation, and partly in section, showing the forming rolls, the carriages, the swinging jaws, and the lead bar, which includes the gaging device; Fig. 4 is a plan view of the lead bar removed from the machine; Fig. 5 is a perspective view of the same; Fig. 6 is a detail in perspective, with parts broken away to show the supporting means for the disappearing gage bar; Fig. 7 is a perspective view of the free end of the lead bar with the yielding gage removed; Fig. 8 is a perspective view of the disappearing gage bar removed from the lead bar; Fig. 9 is a sectional view on the line 9—9, of Fig. 5; Fig. 10 is a sectional view on the line 10—10 of Fig. 8; Fig. 11 is a transverse sectional view on the line 11—11 of Fig. 3; Fig. 12 is a transverse sectional view on the line 12—12 of Fig. 3; Fig. 13 is a transverse sectional view on the line 13—13 of Fig. 3; Fig. 14 is a transverse sectional view on the line 14—14 of Fig. 3.

The invention herein disclosed is an improvement on the construction shown and described in the patent granted to J. E. Abrams, February 15th, 1910, No. 949,722. Many of the features of the present application are common to this patent, and will not need description in detail. The Abrams machine consists generally of a lap seam body maker wherein the size of the can body is determined by the size of the blank fed to the machine, and formed into the can body. This machine includes a series of traveling horns which support the overlapped edges of the can bodies while the same are being soldered. The blanks are passed through curling rolls which curl the same into a can body, and the edges are held spaced from each other as they are moved along by the horns, first one edge being clamped on the horn, after which the other edge is overlapped and clamped on to the horn. In this Abrams machine, the first or under-lapped edge is gaged by a stationary gage, and is then clamped to the horn as it slides along the gage. The overlapping edge is gaged by the jaw which holds down the first edge. It has been found in practice, that where the swinging jaw of each carriage is used as a gage, that great accuracy is necessary in setting up the carriages and fixing the jaws thereto, in order that the jaws may be similarly placed so as to gage with uniformity the can bodies.

The present invention contemplates the provision of a common gage which operates upon both of the edges of each can body, so that as the can bodies are formed, they will be successively gaged by the same means, clamped with their edges overlapping and held until soldered. In order to accomplish this function, I have provided a lead bar which is formed with a gaging face against which the under-lapping edge rests. This gaging face for the under-lapped edge of the can body is yieldingly mounted so that it may be depressed and disappear, so to speak, into the horn to permit the overlapped edge to clamp against the horn. The lead bar also includes a second gaging face for the overlapped edge, which is yieldingly pressed against the can body which passes underneath this gaging face, so that the overlapped edge will with certainty engage this gaging face therefor.

Referring more in detail to the drawings, my improved lap seam body maker consists of a supporting frame or table 1, which is mounted on supporting legs 2, 2, at each end of the table, and central legs 3, arranged intermediate the ends of the table. Disposed along the table is a forming station 4, where the blanks are curled to form the can bodies; a preheating station 5 where the overlapped edges of the body are heated to the proper temperature for soldering; a solder feeding station 6, where the solder, preferably in rod form, is applied to the heated side seam or soldering iron; a solder distributing or applying station 7 wherein a soldering iron distributes the solder along the side seam; a sweat-in station 8, wherein the seam is kept hot until the solder has had a chance to run into the same; a cooling station 9, wherein jets of cold air are forced against a soldered seam for cooling the same. The can bodies are received at the forming station by a series of horns 10, carried by traveling carriages 11. These carriages are connected together so as to form an endless chain.

A sprocket wheel 12 is mounted on a shaft 13 at one end of the machine, and a sprocket wheel 14 is mounted on a shaft 15, at the other end of the machine. These connected carriages forming an endless conveyer or chain, travel around the sprocket wheels, and are engaged thereby so as to be positively driven. Each carriage is provided with rollers 16, 16, which run on suitable tracks 17 located along the table, and prevent the carriages which are pivoted together, from sagging as they pass through the machine, and said rollers 16 run on tracks 18 underneath the table, as the carriages return.

The horn 10 is carried by a standard 19, which is mounted on the carriage so that the horn overhangs the carriage. This horn is bolted to the standard by a suitable bolt 20, which is preferably formed integral with the horn, and a nut screwed on to the end of the bolt engages the outer face of the standard. The horn, as clearly shown in Figs. 12 to 14 inclusive, is considerably smaller than the can bodies at C therein. The horn is formed along its length, with a groove in which is fixed a bar 21. This bar is provided with a recess 22 which is preferably located therein so as to lie directly underneath the overlapped edge which is to be soldered. The horn is also provided with a groove or recess 23, which extends the full length thereof, and which also extends through the standard, so as to form a passageway for the lead bar hereinafter referred to. The standard 19 is provided also with laterally projecting stop or gage arms 24, 24. These arms serve as an end gage for the end of the can body, and also serve as a means for positively carrying the formed can body along with the horn to and through the seaming station. Also mounted on each carriage is a swinging jaw 25 which is pivoted between upwardly projecting lugs 26, disposed at one side of the longitudinal center of the carriage. This jaw has an outwardly projecting lug 27 which carries a roller 28 which moves the jaw into and out of clamping contact with the can body. The jaw, at its free end, is formed with a hardened steel clamping plate 29.

The blanks are formed by passing the same through forming rolls 30 and 31, which are mounted on the cap or cover plate 32, carried by the table 1. These rolls are operated in the same manner as described in connection with the patent above referred to. The blank is shaped by a forming plate 33, which is adjustably carried by the frame, in which the forming rolls are mounted. This forming plate 33 may be adjusted so as to cause the blank to curl into the proper size, which, if unrestricted, would be of less diameter than the diameter of the can body being formed. Side guiding plates 35 and 36 assist in directing the edge of the blank as it is being curled. The edges of the blank, after being curled, are snapped against a lead bar 37, which is fixedly secured to the cap or cover plate 32. This lead bar is formed with a downwardly projecting rib 38 which projects down into the groove or recess 23 of each traveling horn as it passes the lead bar. The lead bar is also provided with a gage bar 39, which is pivoted at 40 to the receiving end of the lead bar.

The upper edge of the lead bar 37 overhangs the gage bar 39 as clearly shown in Fig. 11. The blank as it leaves the forming rolls 30, 31, is bent downwardly by the shaping plate 33, and is directed by the side guiding plates 35 and 36, so that the forward edge or side a of the blank, will be brought into engagement with the edge gage bar 39.

While the blank is being curled to the shape shown in Fig. 11, the horn which is to receive the formed can body, is traveling into the same so that at about the time the blank leaves the forming rolls, the stop or gage arms 24, carried by the carriage, will engage the formed body and move the same along the lead bar.

As soon as the edge b of the body C leaves the forming rolls, it will drop on to the ledge 41 carried by the cap plate, and will pass from this ledge as the carriage moves the can body along the lead bar, and drop on to the horn. The lead bar as shown in Fig. 5, is formed with a cut-away portion 42 at the point where the blank is fed to the forming rolls, and therefore, this edge of the can body as it leaves the rolls may drop down through this cutaway portion on to the ledge. For the remainder of its length, the lead bar is formed with an overhanging shelf 43 underneath which the edge b of the can body passes. The receiving end of the shelf of the lead bar is tapered as shown in dotted lines at 44 in Fig. 3. Fig. 12 of the drawings is a sectional view showing the edge b resting on the traveling horn, and held thereto by the shelf 43 of the lead bar 37. This view also shows the edge b of the can body as gaged by the gage bar 38. The two edges of the can body are now separated by the edge gage bar 38, and the edge gage bar 39, and these edges are slid along said gage bars and toward the free end of the lead bar. The said guide plates 35 and 36 are preferably shaped so as to properly hold the can body centered about the horn, and the edges abutting against the lead bar. These guide plates 35 and 36 at the forming station, are separated somewhat from the can body, so as to allow the free rolling of the blank. At the delivering end however, as shown in Figs. 13 and 14, these guiding plates engage and round up and properly hold in shape the can body.

The gage bar 39 for the edge a of the can body or what I term my disappearing gage, is pivoted to the lead bar. This edge gage bar is formed with an upwardly projecting stem 45 which extends up through an opening in the lead bar, and a spring 46 surrounding the stem, rests on the lead bar at one end, and bears against a thumb nut 47 at the other end. This spring yieldingly holds the free end of the gage bar 39 raised, and the shoulder 48 pressed against the under side of the lead bar. The gage bar 39 is provided with a gaging plate 49, which is located on the side of the gage bar 39, and secured thereto by suitable rivets 50, as shown in Fig. 10. The gaging face 51 of the gage plate 49 is in line with the gaging face 52 of the gage bar 38, so that the edge b of the can body C will pass from the gaging face 52 on to the gaging face 51. The gage bar 39 is also cut-away so that the edge a of the can body resting against the face thereof, will pass from the gage bar 39 at the point 53, (see Fig. 8). In Fig. 13, I have shown the edge a of the can body, as passed over the gage bar 39 and as resting against the bottom of a groove 54 formed in the lead bar. The bottom of the groove 54 in the lead bar is in line with the gaging face 55 of a yielding U-shaped gage plate 56. This gage plate is mounted on the free end of the lead bar.

Screws 57 pass through suitable bolt openings in the gage plate 56 into the lead bar, and springs 58 surrounding said screws 57, normally press the gage plate 56 downward until it rests on the lead bar. The edge a of the can body C passing from the groove 54, will rest against the gaging surface 55 of the gage plate 56. In Fig. 14 of the drawings, I have shown the edge b as resting against the gaging face 49 of the gage bar 39, and the edge a as resting against the gaging face 55 of the gage plate 56. Inasmuch as this gage plate 56 is yieldingly pressed downward, it will bear yieldingly on the can body C directly above the horn, and will prevent the edge a from sliding underneath this gage plate.

The swinging jaw is timed so as to engage the overlapped edge and press the same down against the horn. The gage bar 39 and the gage plate 49 carried thereby, will yield or disappear into the horn, and allow the overlapped edge to be firmly clamped on to the lapped edge, and both the lapped edges clamped to the horn. The final gaging surface for the edges a and b of the can body, are the surfaces 55 and 51. While these surfaces are carried by parts which yield vertically, they are stationary relative to the travel of the can body. Furthermore, each can body, as it passes along the lead bar, will be gaged by these same surfaces, and therefore, if the bodies are cut true, the formed cans will be of exactly the same size. In other words, by providing these gage surfaces which are normally stationary so far as the travel of the can body is concerned, and which operate in succession upon each can body, I have provided common gaging means for each can body, and I am therefore, able to make a uniform size of can bodies.

The swinging jaw has nothing whatever to do with the determining of the size of the can body, as this is determined entirely by the size of the blank, and by the position of the gaging surfaces relative to each other.

Referring more particularly to Figs. 3 and 11 to 14 inclusive, it will be apparent that the blank after passing through the forming rolls, will be engaged by the stop or gage arms carried by the standard, and moved along with the horn. The side guiding plates will position the can body so that the horn will properly enter the same, and hold the can body in engagement with the gaging bars, and round up and properly shape the can body. The edges of the can body will be properly held separated by the lead bar until one edge is gaged and placed on the horn, after which the other edge will be overlapped on the first edge, gaged, and finally clamped against the horn. The gage located within the horn will yield to allow this clamping of the overlapped edges. The swinging jaw of the carriage is moved into engagement with the can body by the roller 28 engaging a cam track 59, which gradually swings the jaw toward the can body, and finally, through the action of the cam shoulder 60, quickly brings the jaw into clamping engagement with the overlapped edges. The swinging jaws are held from moving inward to clamping position, until a proper time, by a cam track 75. Prior to the overlapping of the outer edge on to the inner edge, flux is applied to the inner edge from a fluxing device 76.

In order that the ends of the edges may be even at the time the overlapped edges are clamped, I have provided an ending-up device which consists of an oscillating shaft 61, in a suitable bracket 62, and operated through a propr connection with the cam disk on a shaft 63, extending lengthwise of the machine, and operated by a suitable connection with the main driving shaft. This oscillating shaft 62 is provided with a downwardly projecting finger 64 (see Fig. 2). The shaft is oscillated in proper timing so that the finger is brought against the ends of the edges and presses the same back evenly against the gage arms 24, carried by the supporting horn. This ending up of the side edges of the can body, is accomplished just prior to the clamping thereof. The can bodies which are clamped to the horns, are carried along with the carriages and first presented to the preheating station 5, where a plurality of jets of flames are directed from suitable burners 65 against the overlapped edges of the can body. The overlapped edges in their preheated condition, then pass underneath the soldering iron at the soldering station 7, which may also be heated by suitable gas flames, and the solder properly distributed along the side seam. The solder is fed to the soldering iron from a supply spool 66. The solder, as herein shown, is in rod shape, and is fed through a tube 67, to an intermittent solder feed 68, and then to a tube 69, whereby the same is directed to the soldering iron or to the seam, to be soldered. After leaving the soldering iron, the can bodies are presented to a heating flame at the sweating-in station 8, where the solder is kept in proper position to be properly fed to all the parts of the seam for making a tight joint. Then the can body travels underneath the jets of air from the pipe of the cooling station 9, and the side seam is further carried underneath a cooling wheel 70, which may be driven in any suitable way.

As the carriages reach the end of the table or frame of the soldering table, the swinging jaw is raised from the horn and the bodies are stripped from the horn, and may be led to a suitable conveyer for conveying the same to other machines, or to the stack, if desired.

The blanks for the can bodies may be conveyed to the forming rolls from a feeding-in table 71. This table is preferably provided with guide rails 72 for guiding the blanks, and with a chain 73, which is formed with suitable spaced lugs adapted to engage the end of the blank and force the same into the forming rolls. It is obvious however, that any other form of feeding-in mechanism for the blanks may be utilized. It is also obvious that other solder-applying devices may be used than those herein shown, as the main features of the present invention consist in the shaping, gaging, and clamping of the overlapped edges to form the side seam.

The lead bar is held to the cap or supporting table by bolts 74 which are threaded into the lead bar and pass through suitable openings in the cap or support. Therefore, the lead bar may be readily removed by removing said bolts, and a new lead bar substituted therefor, if the gaging parts become worn.

It will obvious that the machine may be readily kept in the proper condition for turning out uniform work. While I prefer to drive my machine continuously, so that the blanks are formed into can bodies, shaped, the edges overlapped, and soldered, by continuously traveling devices, it is obvious from certain aspects of the invention, that the carriage may be intermittently driven.

While I prefer to use a plurality of connected carriages forming an endless carrier, it is obvious that other forms of supports for the can bodies may be employed, without departing from the spirit of the invention, provided a common gage bar is used which will gage and hold the side edges of the can bodies while they are being overlapped and clamped together, to be presented to the soldering mechanism.

It is obvious that minor changes in the details of construction and arrangement of parts may be made, without departing from the spirit of the invention as set forth in the appended claims.

Having thus described my invention, what I claim as new and desire to secure by Letters Patent is:—

1. A can body forming and side seaming machine including traveling devices for receiving the can bodies and presenting the same to the soldering means, a relatively stationary gaging device operating upon each can body in turn for gaging the edges, means for clamping the overlapped edges on the traveling devices, and means for soldering said overlapped edges while on said traveling devices.

2. A can body forming and side seaming machine, including means for shaping a can body, traveling devices for receiving the can bodies from the shaping means, and presenting the same to the soldering means, a relatively stationary gaging device operating upon each can body in turn for gaging and overlapping the edges, means for clamping the overlapped edges, and means for soldering said overlapping edges, while on said traveling devices.

3. A can body forming and side seaming machine including forming rolls continuously traveling devices for receiving the can bodies from the forming rolls and presenting the same to the soldering means, means operating on each can body in turn for gaging the side edges, means for clamping the edges, and means for soldering the overlapped edges.

4. A can body forming and side seaming machine including forming rolls continuously traveling devices for receiving the can bodies from the forming rolls and presenting the same to the soldering means, means for operating upon each can body in turn for gaging the edges, means for ending up the edges, means for clamping the overlapped edges, and means for soldering said overlapped edges.

5. A can body forming and side seaming machine including forming rolls continuously traveling devices for receiving the can bodies from the forming rolls, and presenting the same to the soldering means, means for overlapping the side edges of the can bodies, means operating on each body in turn for gaging the edges, means for clamping the overlapped edges, and means for soldering said overlapped edges.

6. A can body forming and side seaming machine including forming rolls continuously traveling devices for receiving the can bodies from the forming rolls and presenting the same to the soldering means, means for overlapping the side edges of the can bodies, means operating on each body in turn for gaging the edges, means for ending up the side edges of the can bodies, means for clamping the overlapped edges, and means for soldering said overlapped edges.

7. A can body forming and side seaming machine including a plurality of traveling horns, means for shaping a can body and transferring the same to a horn, a relatively stationary gaging device operating upon each can body in turn, for overlapping and gaging the edges, means for clamping the overlapped edges on said horn, and means for soldering said overlapped edges.

8. A can body forming and side seaming machine including a plurality of continuously traveling horns, means for shaping a can body and transferring the same to a horn, means for overlapping and gaging the side edges of each can body in turn, a single swinging jaw for each horn for clamping the can body thereto, and means for soldering the overlapped edges.

9. A can body forming and side seaming machine including a plurality of continuously traveling horns, means for shaping a can body and transferring the same to a horn, relatively stationary devices operating in turn upon each can body for gaging the edges, means for clamping the edges while gaged to the horn, and means for soldering the overlapped edges.

10. A can body forming and side seaming machine including a plurality of traveling horns, means for shaping and transferring a can body to a horn, a relatively stationary gage bar having separate gaging surfaces for gaging the side edges of the can body, means traveling with each horn for clamping the overlapped edges on the horn, and means for soldering said overlapped edges.

11. A can body forming and side seaming machine including a plurality of traveling horns, means for shaping and transferring a can body to each horn, a relatively stationary lead bar having means for overlapping the edges of each can body and gaging the edges relative to each other, means for clamping the overlapped gaged edges on said horn, and means for soldering said overlapped edges.

12. A can body forming and side seaming machine including a plurality of traveling horns, means for shaping and transferring a can body to each horn, a relatively stationary lead bar having means for overlapping the side edges of each can body, and independent gaging surfaces for each side edge, a swinging jaw traveling with each horn for clamping said gaged edges on the horn, and means for soldering said overlapped edges.

13. A can body forming and side seaming machine including means for sustaining a can body, a lead bar for overlapping the side edges of each can body, independent gaging members for the side edges of the can body, said gaging member for the under edge being yieldingly supported, means for clamping the overlapped edges on the sustaining means, and means for soldering the overlapped edges.

14. A can body forming and side seaming machine including a plurality of traveling horns, means for shaping and transferring a can body to each horn, a lead bar operating in turn upon each can body, said lead bar having means for overlapping the edges, and independent gaging members for the side edges, said horn having a groove extending therethrough adapted to receive the gaging member for the under edge, and means for clamping the overlapped edges of the horn.

15. A can body forming and side seaming machine including a plurality of traveling horns, means for shaping and transferring a can body to each horn, a lead bar operating in turn upon each can body, said lead bar having means for overlapping the edges, independent gaging members for the side edges, said horn having a groove extending there-through adapted to receive the gaging member for the under edge, and a swinging jaw for clamping the overlapped edges on the horn.

16. A can body forming and side seaming machine including a plurality of traveling horns, means for shaping and transferring a can body to each horn, a lead bar for gaging and overlapping the edges of each can body, and guiding members for engaging the outer face of the can body for holding the edges against the lead bar, and for centering the body relative to the traveling horn.

17. A can body forming and side seaming machine including a plurality of traveling horns, a carriage for each horn, a standard mounted on each carriage and supporting the horn, gaging arms carried by each standard for engaging the end of the can body, means for shaping and transferring a can body to each horn, a lead bar having means for overlapping and gaging the side edges of each can body, and means for clamping the overlapped edges on to the horn.

18. A can body forming and side seaming machine including a plurality of traveling horns, a carriage for each horn, a standard mounted on each carriage and supporting the horn, gaging arms carried by each standard for engaging the end of the can body, means for shaping and transferring a can body to each horn, a lead bar having means for overlapping and gaging the side edges of each can body, guiding plates for engaging the outer face of the can body for holding the edges in contact with the lead bar and for centering the body relative to the horn, and means for clamping the overlapped edges on to the horn.

19. A can body forming and side seaming machine including a plurality of traveling horns, a carriage for each horn, a standard mounted on each carriage and supporting the horn, gaging arms carried by each standard for engaging the end of the can body, means for shaping and transferring a can body to each horn, a lead bar having means for overlapping the edges and independent yielding gaging members operating to gage the respective side edges of the can body, and means for clamping the overlapped edges on to the horn.

20. A can body forming and side seaming machine including a plurality of traveling horns, a carriage for each horn, a standard mounted on each carriage and supporting the horn, gaging arms carried by each standard for engaging the end of the can body, means for shaping and transferring a can body to each horn, a lead bar having means for overlapping the edges, independent yielding gaging members operating to gage the respective side edges of the can body, and a swinging jaw pivoted on each carriage for clamping the overlapped gaged edges on to the horn.

21. A can body forming and side seaming machine including a plurality of traveling horns, a carriage for each horn, a standard mounted on each carriage and supporting the horn, gaging arms carried by each standard for engaging the end of the can body, means for shaping and transferring a can body to each horn, a lead bar having means for overlapping the side edges of the can body, and independent yielding gaging members for gaging the respective side edges of the can body, guiding plates for engaging the outer face of the can body for holding the side edges in engagement with the lead bar, and a swinging jaw mounted on each carriage for clamping the overlapped edges on to the horn.

In testimony whereof, I affix my signature, in the presence of two witnesses.

IVAR F. WARME.

Witnesses:
ARTHUR G. CHASE,
F. M. BONTA.